Patented Mar. 5, 1940

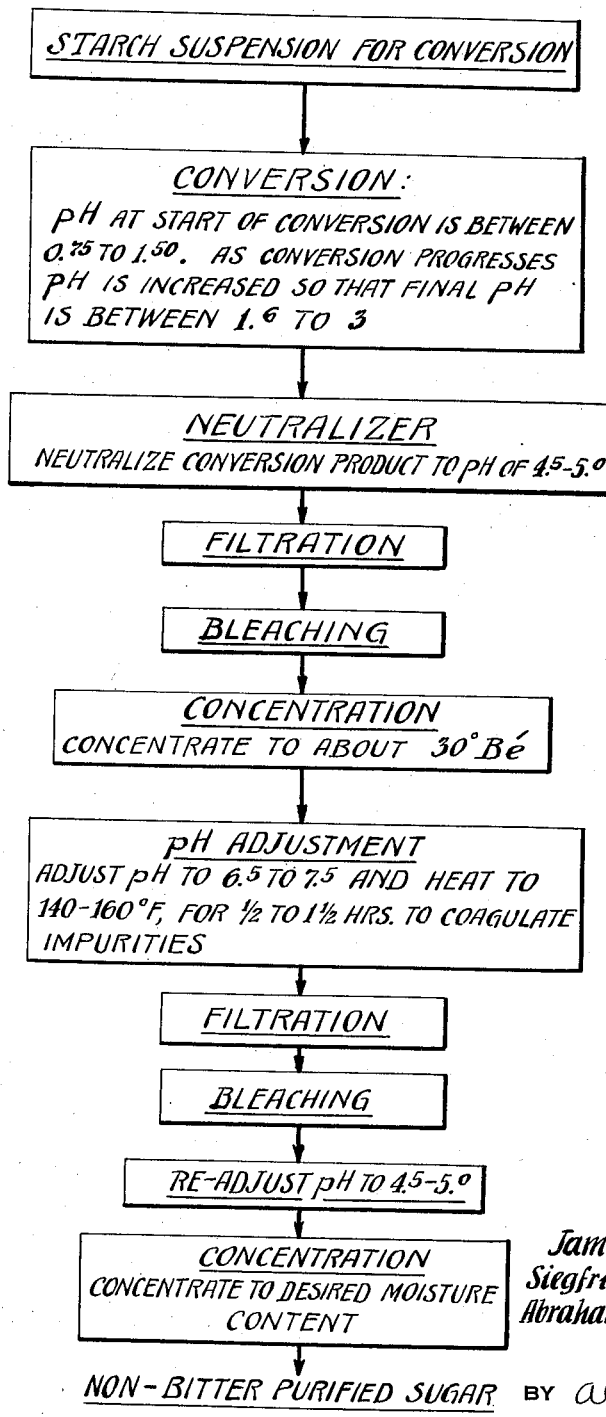

2,192,213

UNITED STATES PATENT OFFICE

2,192,213

NONBITTER STARCH CONVERSION SUGAR PRODUCT AND PROCESS OF MANUFACTURE

James F. Walsh, Chicago, Ill., and Siegfried M. Kinzinger and Abraham H. Goodman, Hammond, Ind., assignors to American Maize-Products Company, a corporation of Maine Application July 27, 1938, Serial No. 221,468

15 Claims. (Cl. 127—36)

Our invention relates to the production of starch conversion sugar products and more particularly to a process for producing non-bitter sugar products from starch without the necessity of refining the sugar product by crystallizing.

Two of the well-known products resulting from conversion of starch such as corn starch, are corn syrup (commonly referred to as glucose) and corn sugar, one form of the latter being commonly known as "70" sugar since it contains approximately 70% dextrose content. The corn syrup is a low conversion starch product and is normally found in the form of a non-bitter liquid. The "70" sugar and similar sugar products are products resulting from higher conversion conditions and are normally in the form of solid bitter sugars. The uses of "70" sugar and similar higher conversion products, because of the bitter principle which they contain, are limited primarily to industrial applications. To render this bitter type of product suitable for food purposes, it is necessary to remove the bitter principle and the commercial procedure heretofore used for that purpose involves crystallizing the sugar product. One of the principal objections to this crystallizing treatment is that it leaves a residue commonly known as hydrol, that contains in addition to the bitter principle a considerable amount of dextrose and other desired components of the conversion product. The formation and removal of this hydrol from the sugar product constitutes a material loss and thereby renders this process of producing non-bitter sugars expensive and commercially undesirable.

In accordance with our present invention we have discovered a process for producing non-bitter starch conversion sugars in which the formation of bitter constituents during the actual production of the non-bitter product is avoided. Since no bitter constituents are formed in our process the expense of additional treatments such as crystallizing processes, as well as the loss of material resulting from such processes are eliminated. From our investigation of this problem of making a non-bitter "70" sugar, for example, we have found that apparently the bitter principle normally contained in such a sugar is caused by a reversion reaction which takes place concomitantly with the conversion of the starch to produce the sugar product. The reversion products that apparently give the usual "70" sugar a bitter taste are a series of disaccharides one of which is known as gentiobiose. This reversion product is not present in glucose and similar low conversion products, but is present in products such as "70" sugar which are produced by a higher conversion process. This high conversion process requires more drastic conversion conditions, namely, higher acid concentrations and higher pressures.

We have found that by proper control of the acid concentration, that is, the pH value of the starch material undergoing conversion, we can carry out the conversion reaction as fully as desired and at the same time control the reversion reaction so that there is no appreciable formation of gentiobiose or other bitter substances. In this manner we have been able to produce for the first time, without the necessity of crystallizing processes, a non-bitter "70" sugar and similar sugar products.

The novel features of our invention are set forth with particularity in the appended claims. The invention itself both as to organization and method of operation, will be clearly understood from the following description taken in conjunction with the accompanying drawing which represents a flow diagram of the conversion process for the production of a non-bitter purified sugar product. Referring now to the drawing, the starting material for use in our process is any suitable starch suspension. This suspension may consist of purified starch obtained from corn by the usual wet milling process. This starch suspension, which may be of the order of 8° Baumé to 23° Baumé, is first adjusted to a pH of about 0.75 to 1.5. This is usually obtained by adding to the starch suspension a suitable acid or other acidifying starch conversion agent. The acids normally used are mineral acids such as, for example, hydrochloric or sulphuric acid, although any other suitable forms of inorganic or organic acid or acidic material may be used in our process so long as it introduces no undesired foreign substances into the conversion material, and will effect the required pH. After this acidification to a pH of about 0.75 to 1.5 the conversion reaction is begun in the usual manner by the application of heat and pressure to effect conversion of the starch into the desired sugar product.

Once the conversion reaction has started, the pH control operation, which is of the essence of our invention, is put into effect so that the initial pH of the conversion mixture is gradually increased as the conversion action progresses. The control of the pH of the conversion mixture is so effected that at the end of the conversion operation the resulting sugar product will have a pH higher than that of the initial mixture and usually will fall within a range of pH values between 1.6 to 3.0. Ordinarily, if the initial pH is toward the low end of the range of initial pH values, the final pH will also be toward the low end of the range of final pH values, but this is not necessarily true. For example, if the initial pH of the conversion mixture is approximately 0.75 the pH of the mixture may be gradually raised during the conversion treatment until at the termination of this treatment the pH of the final sugar product is in the order of about 1.6 or higher. In the same way, if the initial mixture has a pH of about 1.5, this pH may be raised during the conversion to a final pH of about 2.3 up to about 3.0. The proportionate increase may be even greater if desired and the material having the initial pH of about .75 may be treated so that the pH of the final sugar product is as high as about 3.0 but this ordinarily will not be necessary. Starting with pH values intermediate 0.75 and 1.5, the same general type of progressive increase in the pH value during the conversion reaction will be carried out to avoid the formation of the bitter principles.

The above described pH control during the progress of the conversion reaction may be effected by one or a combination of various means. For example water may be added to the conversion mixture during the conversion operation with the result that the acid concentration of the conversion mixture is decreased, that is, the pH value is gradually increased from the original low value to a higher value nearer the neutral point. In addition to increasing the pH value of the conversion mixture the water that is added for this purpose reduces the concentration of the starch suspension and thereby permits the final conversion reaction to take place more rapidly.

A second illustrative means of increasing the pH value in accordance with our invention is the addition of alkali or any suitable basic substance, e. g. sodium hydroxide or potassium hydroxide, to the conversion mixture as the conversion reaction proceeds and especially during the latter stages of the conversion. It is principally during the latter stages of conversion, when the higher starch conversion sugar products are formed, that the bitter principle is most likely to form also, and therefore it is important at these latter stages of the conversion reaction that the pH be raised to a point at which the reversion reaction is minimized.

By the above and various other means of controlling the pH or acid concentration of the conversion mixture we have been able to carry out the process without the formation of any material amount of bitter principle and therefore the conversion product does not have to be crystallized to produce a product suitable for edible purposes. The product of our invention resulting from the above starch conversion operation under controlled pH conditions insofar as bitter principle is concerned, is a completed product at the end of the conversion reaction. To stabilize the product and to improve certain of its physical characteristics such as color, clarity, etc. we have found it advantageous to subject the conversion product to additional refining treatment subsequent to the conversion step, as indicated in the drawing, and described below.

The final conversion product having a pH of about 1.6 to 3.0 is now treated with an alkali or other base material to increase the pH value up to about 4.5 to 5.0. At these values the majority of the impurities present in the product are coagulated and are next removed by filtering the heated conversion product, which is still in a liquid state, to remove these solid coagulated impurities. Following this filtration treatment the filtrate containing the non-bitter sugar is bleached by the addition of vegetable or animal charcoal or other suitable materials commonly used for this purpose, after which it is concentrated by heating to a concentration of about 30° Baumé.

The concentrated sugar product is now further treated with alkali or other suitable basic substance to increase the pH value up to about 6.5 to 7.5 and the product heated at about 140° F. to 160° F. for a suitable length of time to permit the remaining impurities to coagulate. In practice we have found that heating for a period of about ½ to 1½ hours is satisfactory for our purpose. This additional pH adjustment causes the precipitation and coagulation of impurities that were not removed in the original neutralizing treatment above described. After this pH adjustment and heat treatment the product is filtered to remove the coagulated impurities, resulting in a clear solution. This product is now subjected to another bleaching treatment which is followed by a readjustment of the pH value to about 4.5 to 5.0 to stabilize the product. After this adjustment the product is finally concentrated to the desired moisture content and upon cooling produces a non-bitter purified sugar product.

In accordance with one illustrative but non-limiting example, the process of our invention may be carried out as follows:

*Example*

900 gallons of 15° Baumé starch mixtures, to which 50 pounds of 18° Baumé hydrochloric acid is added, is fed to a convertor into which has been previously added 125 gallons of priming water containing 13 pounds of 18° Baumé hydrochloric acid. The pH of the resulting starch suspension is approximately 1.30. During the conversion 800 gallons of water is pumped to the convertor at a steady rate during which time the pH of the conversion mixture decreases from the original pH value of 1.3 to a pH value of 1.70. The conversion is carried on at 45 pounds pressure and at a temperature of about 292–293° F. and requires approximately 23 minutes for completion. The resulting liquor from this conversion is a non-bitter sugar solution. It is then given the purifying treatments as above described and indicated in the drawing below the conversion step.

The final solid, non-bitter, sugar product of this invention may be obtained from the final sugar solution by concentration with heat or in other ways. For example, the sugar solution may be spray dried to convert it into powder or granule form and used in this form or pressed into tablets, blocks or slabs. If desired the final product may be produced in liquid form, that is, as a syrup, instead of the solid dehydrated form, or it may be a combination of liquid and solid. The dextrose content of the final solid, sugar product will depend upon the extent of the conversion treatment and may vary from about 86% to 96% reducing substance calculated as anhydrous dextrose. Products of lower dextrose content such as about 65% to 86% are also to be included in this invention. In the usual case the invention will be used to produce products having a reducing substance content calculated as anhydrous dextrose of about 89% to 92% since this is the range in which the bitter constituents normally occur to the most noticeable extent.

The final products of our invention contain all of the starch conversion substances including dextrose, maltose and dextrins and have the following general physical and chemical characteristics:

a sweet, non-bitter crystalline sugar containing substantially all of its products of conversion, consisting of essentially maltose, dextrose, and dextrins, being free of its undesired impurities, which are controlled as we may desire them. This sugar comprises usually a reducing sugar content of about 86% to 96% calculated as anhydrous dextrose and is free of bitter principles; the ratio of the amount of maltose and dextrins present will vary in proportion to the dextrose content.

The term "uncrystallized" as used in the claims herein is intended to distinguish our non-bitter sugar product from crystallized dextrose and similar products produced by the extended crystallization procedures commonly used in the manufacture of dextrose for producing crystals of sufficient size and proper shape to be purged of the hydrol by centrifuging. This term is not intended to infer that our product is non-crystallizable since in fact the non-bitter syrup crystallizes upon cooling and solidification but the crystals formed are not of the size or form commonly employed in isolating dextrose for purging; our non-bitter sugar product not requiring purging or freeing of hydrol to provide sweetness.

Various modifications and changes may be made in the process and materials of our invention as described above, without departing from the scope of the invention.

We claim:

1. A process of producing a non-bitter starch conversion sugar product comprising acidifying a starch suspension to a pH value of about 0.75 to 1.50, and heating said starch suspension sufficiently to effect the desired degree of conversion and during the conversion reaction progressively increasing the pH value of said suspension so that at the end of the conversion reaction the sugar product produced has a pH value of about 1.60 to 3.0.

2. A process of producing a non-bitter corn starch conversion sugar product comprising acidifying a corn starch suspension to a pH value of about 0.75 to 1.50, heating said corn starch suspension sufficiently to effect the desired degree of conversion and during the conversion reaction progressively increasing the pH value of said suspension so that at the end of the conversion reaction the sugar product produced has a pH value of about 1.60 to 3.0.

3. A process of producing a non-bitter starch conversion sugar product comprising acidifying a starch suspension to a pH value of about 0.75 to 1.50, heating said starch suspension sufficiently to effect the desired degree of conversion and during the conversion reaction progressively increasing the pH value of said suspension so that at the end of the conversion reaction the sugar product produced has a pH value of about 1.60 to 3.0, and further neutralizing said converted sugar product to a pH of about 4.5 to 5.0 to effect coagulation of insoluble impurities, filtering to remove said impurities followed by bleaching and concentrating said product.

4. A process as defined in claim 3 in which the final sugar product is given a further pH adjustment to about 6.5 to 7.5 to effect coagulation of any remaining impurities and removing said impurities.

5. A process as defined in claim 3 in which the pH of the non-bitter, converted sugar product is adjusted to about 6.5 to 7.5 to effect coagulation of any remaining impurities, followed by removal of said impurities, bleaching the thus purified product, readjusting the pH value thereof to about 4.0 to 5.0, and concentrating to the desired moisture content.

6. A process for producing a non-bitter starch conversion product while eliminating the usual crystallizing and purging treatments normally required to effect the desired sweetness, comprising subjecting an acidic starch suspension, having an initial pH value not greater than about 2 and not substantially less than about 0.75, to a conversion treatment and during said treatment adding to the acidic suspension a substance that reduces the acid concentration thereof so that the pH value of the suspension is progressively increased during the conversion operation from said initial value to a value not substantially greater than 3, whereby formation of bitter conversion products is avoided.

7. A process of producing a non-bitter starch conversion product as defined in claim 6, in which the pH value of the starch suspension is increased during the conversion operation by the addition thereto of water.

8. A process of producing a non-bitter starch conversion product as defined in claim 6, in which the pH value of the starch suspension is increased during the conversion operation by the addition thereto of an alkaline material.

9. A process as defined in claim 6 in which the conversion treatment is carried out sufficiently to give the final non-bitter conversion product a reducing substance content, calculated as anhydrous dextrose, of about 65% to 96%.

10. A process for producing a non-bitter starch conversion product as defined in claim 6, in which the original starch suspension has a specific gravity of about 8° Bé. to 23° Bé.

11. A process for producing a non-bitter starch conversion product as defined in claim 6 in which the desired pH value of the original starch suspension is produced by addition thereto of a mineral acid, and the pH value of the suspension is increased during conversion by addition thereto of alkali.

12. A process as defined in claim 6 in which the starch suspension before conversion has a pH value of about 0.75 to 1.5 and at the end of the conversion operation the starch conversion product has a pH value of about 1.6 to 3.0.

13. An edible non-bitter starch conversion product comprising all of the substances of the starch conversion, including dextrins, maltose and dextrose, resulting from converting a starch suspension having an initial pH value not greater than about 2 and not substantially less than about 0.75 and progressively increasing during the conversion operation the pH value of the conversion mixture to a value not substantially greater than about 3 to avoid formation of bitter constituents, the combined amount of dextrose and maltose in said product ranging between about 65% to 92%.

14. An edible non-bitter starch conversion product as defined in claim 13 in which said product is a sweet sugar syrup containing about 65% to 86% of dextrose and maltose combined.

15. An edible non-bitter starch conversion product as defined in claim 13 in which said product is a solidified, uncrystallized, unpurged, sugar containing about 86% to 92% maltose and dextrose combined.

JAMES F. WALSH.
SIEGFRIED M. KINZINGER.
ABRAHAM H. GOODMAN.